(12) United States Patent
Audebert et al.

(10) Patent No.: US 9,010,650 B2
(45) Date of Patent: *Apr. 21, 2015

(54) CONFIGURABLE DIGITAL BADGE HOLDER

(71) Applicant: Assa Abloy AB, Stockholm (SE)

(72) Inventors: Yves Gabriel Louis Audebert, Los Gatos, CA (US); Eric F. Le Saint, Los Altos, CA (US); Jason Hart, Fremont, CA (US); Dominique Louis Joseph Fedronic, Belmont, CA (US)

(73) Assignee: Assa Abloy AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/102,681

(22) Filed: Dec. 11, 2013

(65) Prior Publication Data

US 2014/0097936 A1 Apr. 10, 2014

Related U.S. Application Data

(63) Continuation of application No. 11/969,129, filed on Jan. 3, 2008, now Pat. No. 8,628,019.

(60) Provisional application No. 60/878,069, filed on Jan. 3, 2007, provisional application No. 60/881,162, filed on Jan. 19, 2007.

(51) Int. Cl.
| | |
|---|---|
| *G06F 17/00* | (2006.01) |
| *G06K 19/00* | (2006.01) |
| *G06K 19/06* | (2006.01) |
| *G05B 19/00* | (2006.01) |
| *G07C 9/00* | (2006.01) |

(52) U.S. Cl.
CPC ........ *G07C 9/00111* (2013.01); *G07C 9/00071* (2013.01); *G07C 2009/00769* (2013.01)

(58) Field of Classification Search
USPC ............ 235/487–492, 375, 382; 340/5.2, 5.7, 340/5.8, 572.1
See application file for complete search history.

(56) References Cited

U.S. PATENT DOCUMENTS

| | | | |
|---|---|---|---|
| 2005/0077348 A1* | 4/2005 | Hendrick | 235/380 |
| 2006/0219776 A1* | 10/2006 | Finn | 235/380 |
| 2008/0011827 A1* | 1/2008 | Little et al. | 235/380 |
| 2008/0116264 A1* | 5/2008 | Hammad et al. | 235/382 |

FOREIGN PATENT DOCUMENTS

EP  0 159 539 A  10/1985

* cited by examiner

*Primary Examiner* — Michael G Lee
*Assistant Examiner* — Laura Gudorf
(74) *Attorney, Agent, or Firm* — Muirhead and Saturnelli, LLC

(57) ABSTRACT

A portable authentication system includes a security module, that may be a smart card, SIM (Subscriber Identity Module), USB controller with a secure chip, or similar module capable of storing one or more credentials, and an interface module such as a digital badge holder that is able to communicate with the security module, for instance by providing a smart card communication interface. The portable authentication system may be either a single integrated system or a dual system where the security module can be removed or disconnected from the interface system.

14 Claims, 5 Drawing Sheets

CONFIGURABLE DIGITAL BADGE HOLDER

RELATED APPLICATIONS

This application is a continuation of U.S. application Ser. No. 11/969,129 filed Jan. 3, 2008 (pending) which claims priority to U.S. provisional patent application 60/878,069 filed on Jan. 3, 2007 and U.S. provisional patent application 60/881,162 filed on Jan. 19, 2007, all of which are hereby incorporated by reference.

RELATED U.S. APPLICATIONS DATA

This application claims priority under 35 U.S.C. 119(e) of provisional patent applications Ser. No. 60/878,069 filed Jan. 3, 2007 and Ser. No. 60/881,162 filed Jan. 19, 2007, entitled "Configurable digital badge holder", which are hereby incorporated by reference in their entirety.

BACKGROUND OF THE INVENTION

1. Field of the Invention

The invention relates to the field of authentication systems and methods for physical access.

2. Related Art

Many organizations protect themselves with physical and logical access control systems (PACSs/LACSs) based on proximity cards, such as contactless access badges. Large enterprises with multiple sites often need to maintain multiple independent PACSs/LACSs for their different sites due to the complexity and cost to homogenize the information technology (IT) infrastructure or upgrade technology to a single solution.

Because the credential in the proximity card is static and unique and cannot depend on the context of use, a single card is prohibited from accessing more than one of these multiple sites or domains, each with an independent PACS/LACS and access points using different technologies. Access points may be contact or contactless door readers, wireless access points, Firewire, USB, smart card readers, mouse or keyboard, microphone, audio, video or any other contact interfaces on laptop or desktop terminals or kiosks. Consequently, employees of large corporations who travel to different sites or locations must carry multiple proximity cards or disregard provided access control means (e.g. act as visitors).

The proximity contactless card technology for access control is well known. A card reader installed at each specified doorway or entry point generates an electromagnetic field. The ensuing electromagnetic induction activates the antenna of each contactless proximity card entering the field to release a unique static identifier, authenticator or credential. The reader obtains this credential and forwards it to a central controller for validation and assessment of authorization. Upon notification of success, the card reader then gives access to the secure site, for example, by unlocking a door to a secure area.

In addition to the incapability to produce context dependent credentials, another limiting factor of the proximity contactless card is its restricted use to access points or door readers that require contact or contactless proximity interface such as ISO 7816, 125 kHz proximity, or ISO 14443. This constraint excludes other vicinity or medium range wireless protocols such as ISO 15693, 802.11, or Bluetooth, since the card itself does not have the necessary embedded power to implement those protocols.

There are security drawbacks with the use of current proximity card technology such as contactless proximity cards. The proximity cards do not offer self-protection against copying and stealing since the credential can be released without user consent when the card is not protected with a passive shield. Any proximity contactless field caused by a door reader or access point will cause the proximity card to release the credential. Therefore, a proximity card could possibly be simulated with a simple copy of the credential. Also, with multiple proximity cards per employee rather than one, the average number of lost or vulnerable cards is increased, which in turn increases the average amount of time that lost or stolen enterprise cards are in possession of attackers.

Digital badgeholders are interface devices for smart cards or badges. Digital badgeholders generally provide up to three communication interfaces: interface with cardholder such as PIN pad for smart card PIN entry, interface with the smart card or badge such as ISO 7816 contact interface, and interface with access points of the IT network for administration or proximity contactless usage. Existing digital badgeholder technology provides wireless or contactless communication that can simulate a contactless card. Document US 2006-0213982 A1 describes a portable biometric identification device with regular smart card capabilities. The device includes smart card read/write capabilities and transmission of electronic data protected in the smart card through a wireless interface. The document does not, however, describe how a single device can access multiple sites that each have a different PACS/LACS. Specifically, the application lacks the means to select and release the appropriate credential, with the appropriate interface protocol and policy according to the context of use.

Other known portable proximity contactless authentication devices for physical access consist of one single integrated device and include a security module to store the credentials, such as a SIM, a Smart Card, a SAM, or Mobile TPM, or a USB controller including a secure chip. Such devices are supporting either conversational contactless protocols such as 13.56 MHz ISO 14443A or B (e.g. MIFARE, or FIPS201 dual interface smart cards), or are based on non-conversational contactless protocols as for instance 125 kHz proximity cards. Non-conversational interface protocols are implemented with a reader that produces an electromagnetic field but remains uncommunicative and a portable device that broadcasts its credential as soon as the electromagnetic field is encountered. None of the above devices can provide context-dependent credentials with non-conversational readers such as proximity card readers.

Objects and Advantages

Large organizations will greatly benefit from a single personal authentication device, either a digital badgeholder or a single integrated device, which is capable of enabling logical or physical access to multiple sites.

In order to reduce the overhead costs of purchasing, tracking and maintenance, and improve security, a single portable device or system per organization employee able to simulate multiple proximity contactless cards, and that does not require modification of the infrastructure, is desired.

In most situations, the PACSs of different sites require independent credentials, and possibly different contact or contactless protocols. For instance, a MIFARE protocol could be required in site A and a proximity card in site B. The personal device or system must be configurable prior to release of a credential using an interface protocol that is specific to the context of use. It is therefore desirable that the configuration is automated, although a manual configuration is acceptable.

A protection against credential stealing and copy is also desired, such as a controlled release of the credential with user consent or authentication.

If user authentication to the device is required to occur within the proximity induction field of the access point or more generally each time the device enters in contact with the access point, the efficiency of the solution would decrease when compared to the current situation where rapid access is allowed without user authentication. In order to preserve the normal user experience, such as rapid authentication at the door, user authentication should be allowed outside the proximity field of the door reader.

Finally, a single sign-on experience is desired for optimal efficiency. Once the authentication device is activated after a successful user authentication, the credential and interface protocol configuration should be maintained for successive authentications without requiring user authentication at each door or access point. The capacity to release the credential without re-authenticating the user expires when a security condition occurs such as a timeout expiration or an explicit deactivation from the user.

SUMMARY OF THE INVENTION

The proposed invention comprises a portable authentication system consisting of a security module, that may be a smart card, SIM (Subscriber Identity Module), USB controller with a secure chip, or similar module capable of storing one or more credentials, and an interface module such as a digital badge holder that is able to communicate with the security module, for instance by providing a smart card communication interface. The portable authentication system may be either a single integrated system or a dual system where the security module can be removed or disconnected from the interface system.

According to the invention, there is provided a portable authentication device for the authentication of an individual to at least one Access Control System, comprising a section for storing at least one credential which authenticates the device to the Access Control System, and at least one interface protocol for exchanging data with at least one type of access point of said at least one Access Control System, wherein it further comprises:
- a section for defining several contexts represented with context identification data referencing at least one credential and at least one interface protocol corresponding to said type of access point,
- a selector for dynamically selecting one of said contexts to correspond with the said Access Control System.

In one embodiment, the portable authentication device according to the invention comprises:
- a security module for protecting said at least one credential, and
- an interface module which includes said at least one interface protocol, and said selector.

More particularly, said security module may comprise a section that authenticates said individual before releasing any information protected by said security module.

Said security module may comprise a section that confirms consent of the individual before releasing any information protected by said security module.

Said security module may be embedded in said portable authentication device and include one element of the group consisting of a smart card chip, a Subscriber Identity Module and a USB controller.

In one embodiment, said security module is removable from said portable authentication device and includes one element of the group consisting of a smart card, a Subscriber Identity Module and a USB token, and wherein said interface module includes one element of the group consisting of a badge holder, a Subscriber Identity Module holder and a USB token holder.

More particularly, said interface module may include a security module detector for detecting when said security module is connected to said interface module.

In a particular embodiment, said selector is a manual selector to be dynamically activated by said user.

Said selector may include a detector for detecting a type of access point of said at least one Access Control System and a switch for automatically switching to the context which corresponds to said detected type of access point.

BRIEF DESCRIPTION OF THE DRAWINGS

A particular embodiment of the invention will now be described with reference to the accompanying drawings in which.

DETAILED DESCRIPTION

Figure 1:
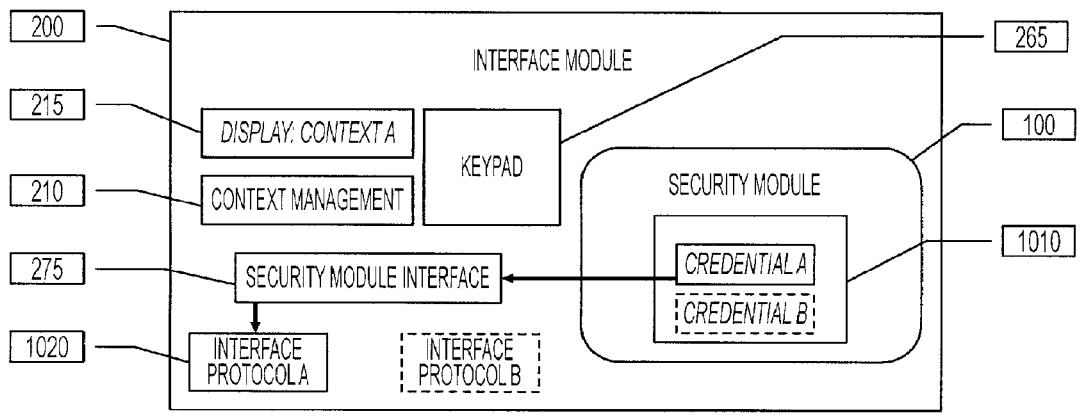
FIG. 1 is a block diagram of a portable authentication system according to the invention.

The system of the invention as illustrated in FIG. 1 comprises a security module (100) and an interface module (200).

Generally speaking, the security module (100) comprises at least the functions of storage of user credentials.

The security module (100) optionally includes:
Protected user authentication function, for instance PIN Validation. The authentication function should be implemented and enforced on the security module
Protected external authentication function, for instance challenge/response based on a secret key stored in the security module. The authentication function should be implemented and enforced on the security module
Protection of user credentials. The user credentials should only be accessible for use after the user or interface module has been authenticated.

The interface module is generally comprised of a portable device body (200) and a microcontroller with power management and memory to control execution of its functions. The interface module also includes the potential to read the selected credential, and to detect security module presence or removal when the security module is removable or can be disconnected.

Optionally, the interface module may include a display for feedback and a clock for timed breaks. It may also include a set of buttons to manually set the context of operation, activate the interface module by preparing the credential for the next physical access opportunity in that context, and express user consent to release the credential. The interface module also optionally includes a user interface component to capture a user credential or authentication data such as a PIN with a keypad.

More specifically, the interface module (200) comprises at least the following functions:

- establish a connection with the security module
- Automatically or manually select the current context of operation.
    - Manual context selection may include one or several selection buttons or other type of manual actuators assigned to several pre-defined contexts. The buttons must be activated to enable the selection of one of the predefined contexts.
    - The automated context selection function may for instance rely on the capacity of the interface module to behave as a contactless or wireless device reader, as for instance a RFID tag reader. When entering the contactless field of an access point, the interface module first attempts to read a context identifier, for instance incoming from a RFID tag that is placed near the physical access point.
    - Alternatively, the automated context selection function may rely on the capacity of the access point reader electromagnetic field to broadcast a context identifier so the interface module can read it without emitting its own independent field. For instance an RFID tag can be placed inside the electromagnetic field of the access point reader, which forces it to broadcast its identification information.
    - In the case of a contact interface, the context selection can for instance be based on an identification, authentication or directive obtained through the access point.
    - If the first context identifier obtained with the interface module is insufficient to fully characterize the context, but sufficient to identify the interface protocol, then additional context specific information such as a reference to the key or credential used for authentication maybe obtained through the interface protocol.
- In accordance with the identified context, select and configure the credential, the access point interface protocol, and the user authentication policy.
- Transfer credentials from the security module to the interface module, and
- When presented inside a contactless field, release the said credential from the interface module to an access point according to the selected configuration: a choice of credential, a choice of contactless protocol, and a choice of user authentication policy.

The interface module (200) optionally includes:

- Detection of the presence or absence of security module
- a user authentication interface or sensor such as, but not limited to, a PIN pad.
- Means to delegate the user authentication function to the security module.
- The authorized configurations may be modified and restricted with administrative privileges
- Logic to request user authentication. The user authentication function is invoked in one of the following ways:
    - At security module installation, when the security module is removable or can be disconnected.
    - At context selection
    - At credential transfer time
    - At credential release time
    - At any time prior to credential release.
- A user consent interface such as a button or sensor and a corresponding function that is invoked as substitute or complement of the user authentication before the release of the credential. This is particularly desirable when the user authentication occurs before the interface module is in contact with the access point.
- A credential erasing function that deletes the credentials from the badge holder memory and must be invoked when the security module is disconnected from the interface module or when specific security events occur such as, a time out or a specific number of credential uses has been reached.

The portable authentication system (FIG. 1.) comprises a security module (100) and an interface module (200). The security module may be a Smart Card, SIM, TPM, HSM, or equivalent, and generally provides tamper evidence and access control features such as user authentication by means of passwords, biometrics, or external system authentication using cryptographic keys. The module may also store one or more multiple credentials or keys for use in physical access control system protocols, such as proximity card identifiers, MIFARE ID, FIPS201 CHUID.

The interface module is a portable device able to establish a logical communication with the security module. It comprises a main device body (200) with at a power management component (250) able to sustain one processor or microcontroller that executes the code of the interface module functions.

The interface module also includes at least a security module interface component (275) (e.g. ISO 7816 contact) with means to obtain a credential from the security module, such as reading a container following a PIN verification, or obtaining an authenticator with a challenge response operation. The security module interface component optionally includes the following functions: a) Detect presence and proper installation or absence of security module, when the security module can be removed or disconnected. b) Initiate a logical communication channel with the module (mutual authentication using symmetric or asymmetric keys can optionally be envisaged.) c) Close a logical communication channel. d) Authenticate user to the security module e) Disable authenticated states. f) Read credential. The invention requires only function f).

The interface module also includes at least one access point interface component (230) able to support at least a conversational or non-conversational contact or contactless protocol for physical access control such as proximity cards, MIFARE, ISO 14443 or equivalent. This protocol generally requires an antenna for contactless field detection and data communication. The access point interface component also includes a logical interface protocol with the following two functions:

- detection of the presence of a corresponding contactless field, or of a contact with an access point.
- transmission of the credential to the access point. This function optionally includes a communication establishment protocol if the protocol is conversational. The communication establishment protocol may include privacy features and require cryptographic resources (keys, algorithms) provided by the security module as well.

The interface module also includes a context management component (270) that includes either:

- at least one automated context selection component able to obtain context identification data either through contact interface established with the access point component, or through a conversational or non-conversational contactless protocol such as RFID, MIFARE, ISO 14443, or a short or long range wireless such as Bluetooth, ISO 802.11 (Wi-Fi), or equivalent when a contactless (or unknown contact) access point must be accessed. The interface and protocol that provide the context identification data may be different than the actual interface and protocol of the access point. For instance, a RFID tag identifier may be read and used as context data to determine the access point and the appropriate interface protocol and credential. An other example is to use GPS-compliant information obtained from a local unit (cellphone, RFID tags) may be used to locate the position. This context management component may therefore either correspond to the access point interface component with the additional function of automated context ID capture, or it may be a separate component with different contactless protocol and may require an additional antenna for contactless field detection, data communication, and logical protocol function to control the communication with the context ID provider. Upon identification of the context, the component selects the appropriate credential, protocol and user authentication policy suitable for further credential transfer and credential release.

or at least one manual context selection component able to establish a predefined context of operation and select the appropriate credential, protocol, and user authentication policy appropriate for further credential transfer and credential release.

A combination of both components can be envisaged if the automated context selection cannot be assured.

Figure 2:
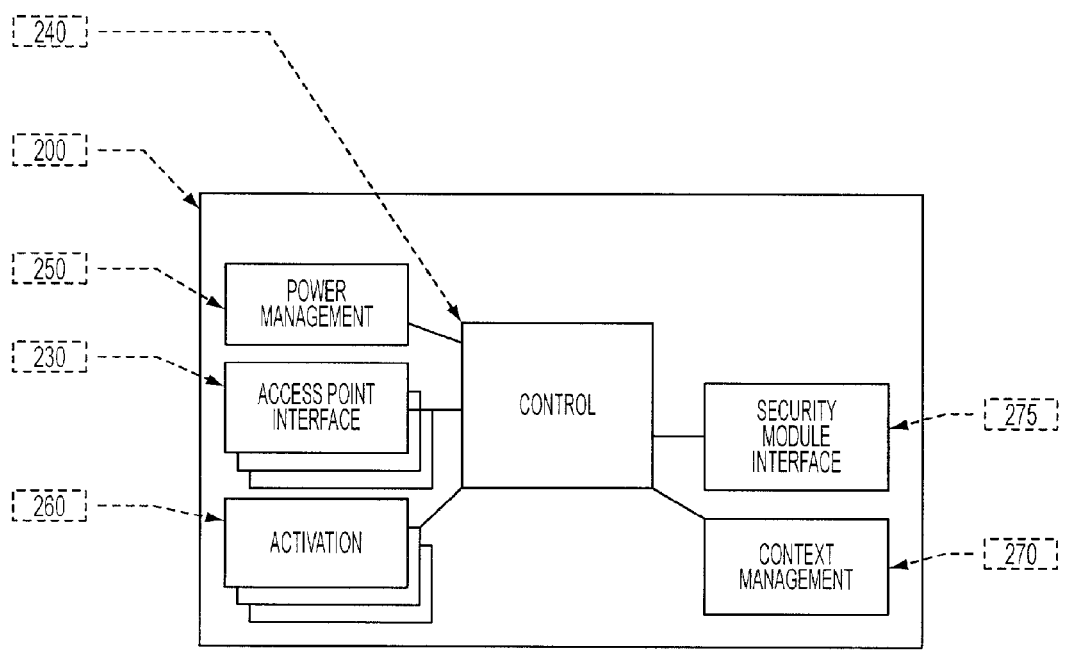
FIG. 2 is a more detailed block diagram of the interface module of the system of FIG. 1.

The context management component (270) also includes a configuration component. Upon any change to the context selection, the corresponding configuration is set. The configuration corresponds to all parameters necessary to successfully execute the authentication for physical access in the context that has been identified. The configuration defines the credential to use, the policy to maintain, the interface protocol to put in operation. These configuration parameters may include, but are not restricted to (FIG. 2.) a user-authentication policy (1010), a credential reference, (1010) such as a smart card container and record tag or URI/URL, a cryptographic key reference for authenticating the security module to the physical access system, and a reference to the supported access point interface component.

Figure 3:
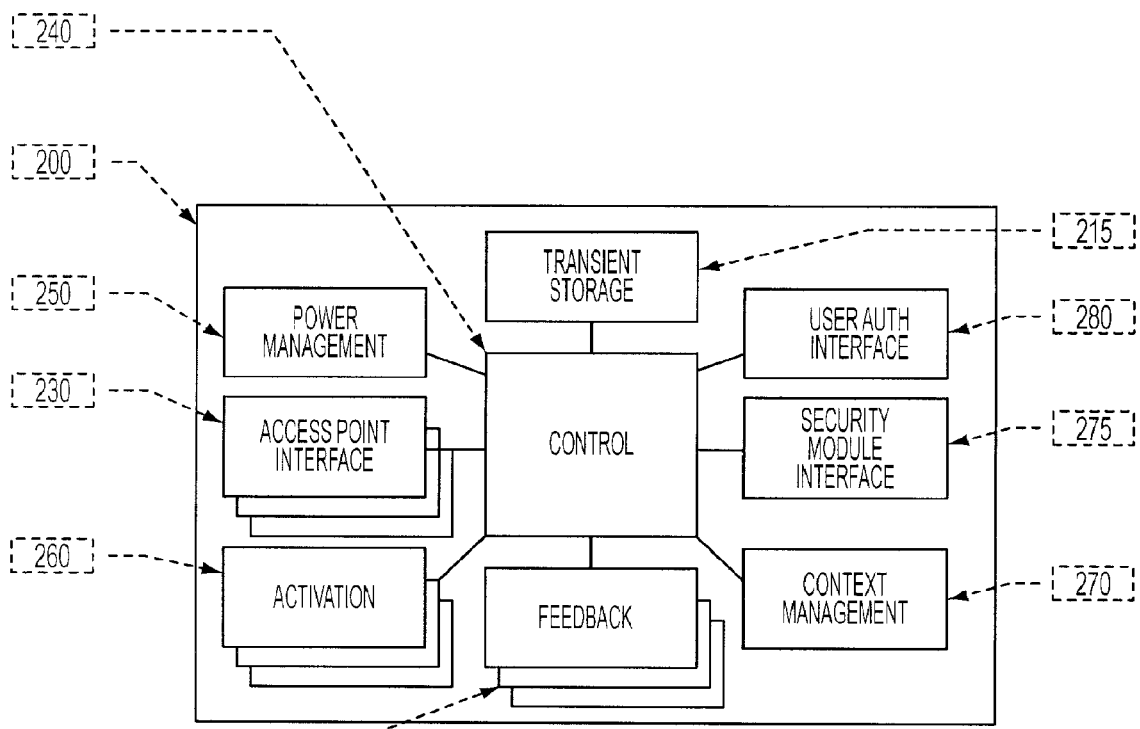
FIG. 3 is a block diagram of another embodiment of the interface module.

FIG. 3 shows optional components for the interface module.

The interface module optionally includes at least one transient storage component (215) able to a) temporarily store the credential read from the smart card before credential release =, b) release the credential to the access point interface during credential release and c) delete the credential from transient memory.

The interface module optionally includes one or more user authentication or user consent interface components (280) able to capture a password or biometric information. For instance, the components could be a consent button, a PIN pad (265), a biometric capture sensor (280), or a camera able to capture physical traits, such as the iris of the eye.

The interface module optionally includes one status feedback component, (265) such as LED, LCD, or audible sound to indicate status information that includes but is not limited to normal states, and malfunctioning states, such as absence of context, absence of credential in the transient storage during credential release.

The interface module optionally includes one configuration feedback component, (265) such as LED, LCD or audible sound to indicate the selected context and communicate context updates.

The interface module optionally includes one user authentication or consent feedback component (265) such as LED, LCD, or audible sound to indicate user authentication or user consent function success.

The interface module optionally includes one activation feedback component (265), such as LED, LCD, or audible sound to indicate credential transfer function success, or credential deletion success from transient storage (e.g. when a timeout expires or when the user explicitly deletes the credential). Alternatively, the display may continuously indicate whether a specific credential is present in the transient storage of the interface module (e.g. The timeout has not expired).

The interface module optionally includes one access feedback component (265), such as LED, LCD, or audible sound to indicate credential release function success, or the resulting access authorization state if the protocol permits it.

Several feedback components may share the same interface device. For instance, all feedback may be provided on the same LCD. All audible feedback may be produced through the same audio interface with different frequencies.

The interface module optionally includes a credential activation interface component (260) (e.g. a button or switch to manually activate the credential transfer function and initiate a timeout). The context security policy may require the credential transfer function as a first successful user authentication step.

The interface module optionally includes a release activation interface component, (260) (e.g. a button or switch to activate the credential release function when the interface module is placed in the access point contactless field). The context security policy may require a credential release only after a first successful user authentication, or user consent.

The interface module optionally includes a credential deactivation interface component, (260) (e.g. a button or switch to activate the credential deletion function) which enables the user to eliminate the credential from the transient memory and disable the security module authentication status which prohibits further access until the user reauthenticates or reactivates the credential. The credential deletion may also be triggered from the control component upon repletion of a security event such as a timeout, a maximum number of uses or other asynchronous security event.

The interface module optionally includes one control component (240) able to coordinate the multiple functions, enforce the state of the system, and execute the proper sequence of operations according to the user authentication policy and configuration of the currently selected context. The controlled functions and components include power management, security module connection detection, security module interface, context selection, configuration selection, credential deactivation or deletion, user authentication interface, and manual input user interface elements.

Of course, any arrangement or implementation of the components within the interface module is possible as long as the necessary invention functions are implemented and follow the context-specific policies. For instance, all components may be implemented in a single module, controlling directly the different interfaces.

Figure 4:
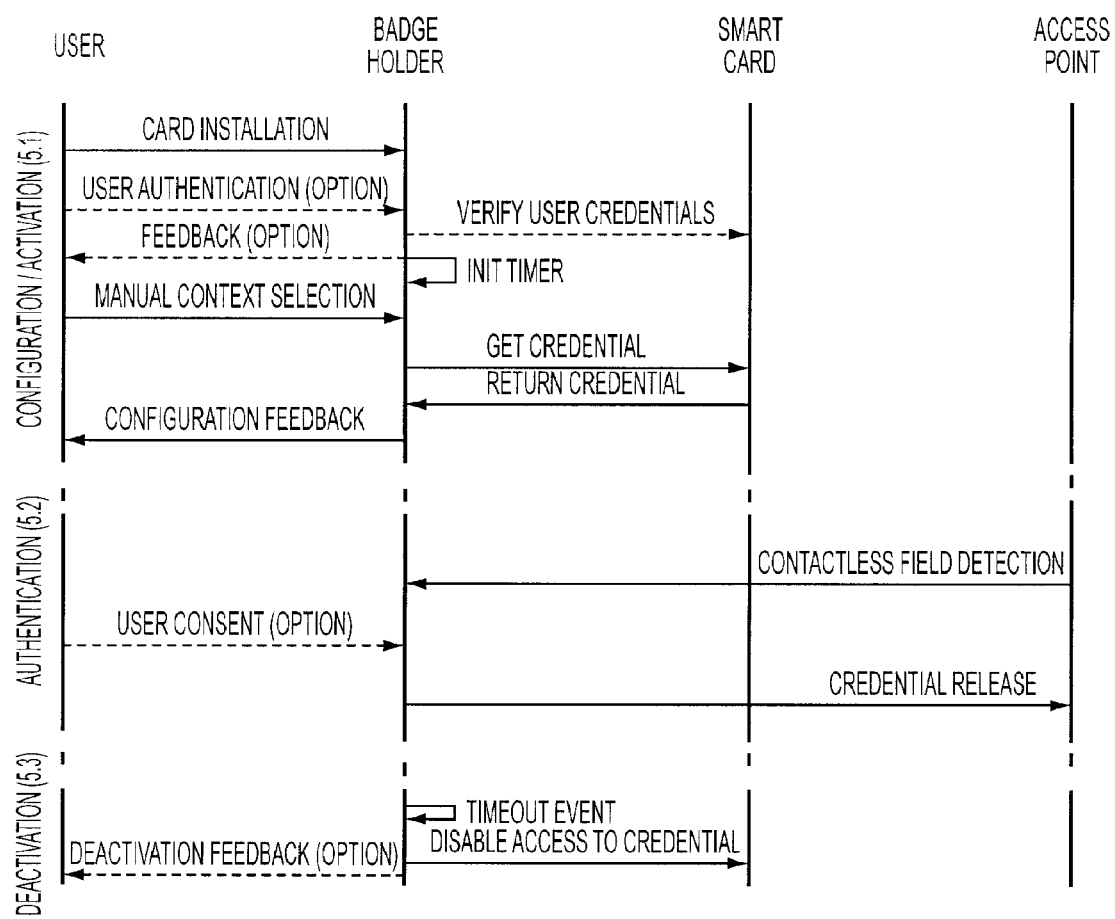
FIG. 4 is an illustration of a context selection authentication method of the invention.

The example of FIG. 4 shows the manual context selection authentication method leveraging a configurable digital badge holder equipped with a smart card.

In this example, the authentication data and secrets of a company employee are stored in a smart card and include:
a Proximity card identifier
a RFID identifier
a FIPS201 CHUID for physical access through a ISO 14443 contactless interface a symmetric key and counter used to generate a one-time password for remote access through a display of the reader, in non-connected mode a private key and certificate used to provide a PKI authentication function for access to a local enterprise network.

The entire sequence of operations acts under a control component (240). Prior to accessing any door or network, the device holder inserts his smart card (100) into the badge holder (200). The security module interface component remains inactive until it detects the presence of the card, at which point it causes the feedback component to prompt the user for his PIN. Once the PIN is entered into the interface component, it is transferred through the smart card for verification. Upon successful verification, further information is accessed from the smart card, a security timer begins, the feedback component prompts the user to manually select a context of operation, and the user choice is displayed on an LCD. When the selection is completed, the configuration management selects the credential reference, the interface protocol reference, and the security policy adapted to the context identifier (e.g. Building1 credential, proximity card protocol and "User consent policy"). The appropriate credentials are read or generated from the smart card through the smart card interface and stored in transient memory of the badge holder with the transient storage component. The badge holder is now activated and this is indicated with an audio or visual feedback.

When the badge holder is placed in the contactless field of the access point (400) that matches the selected interface protocol, it evaluates the selected policy. The credential release component will then wait for the user to manually activate the release of the credential. When the consent button is pressed, the credential is released with an audio feedback and captured by the access point reader. If valid, the physical access control system will unlock the access point or door.

When the security timer started during the configuration phase expires, the credentials are erased from transient memory and the smart card authentication states are deleted. Further authentication at access points is impossible unless the user presents his PIN again.

When the smart card holder travels to a different location where other offices of his organization are situated, the local security infrastructure may include a different Physical Access Control system and different door readers using a proximity card 125 khz contactless interface. The employee then presents his PIN for verification, modifies the selected context identifier to "Building B". The effect is to load the new building B credentials and to set a new default protocol such as MIFARE. The badge holder is now activated for usage to access points of Building B.

The invention includes the following two methods that leverage the portable authentication system.

Figure 5:
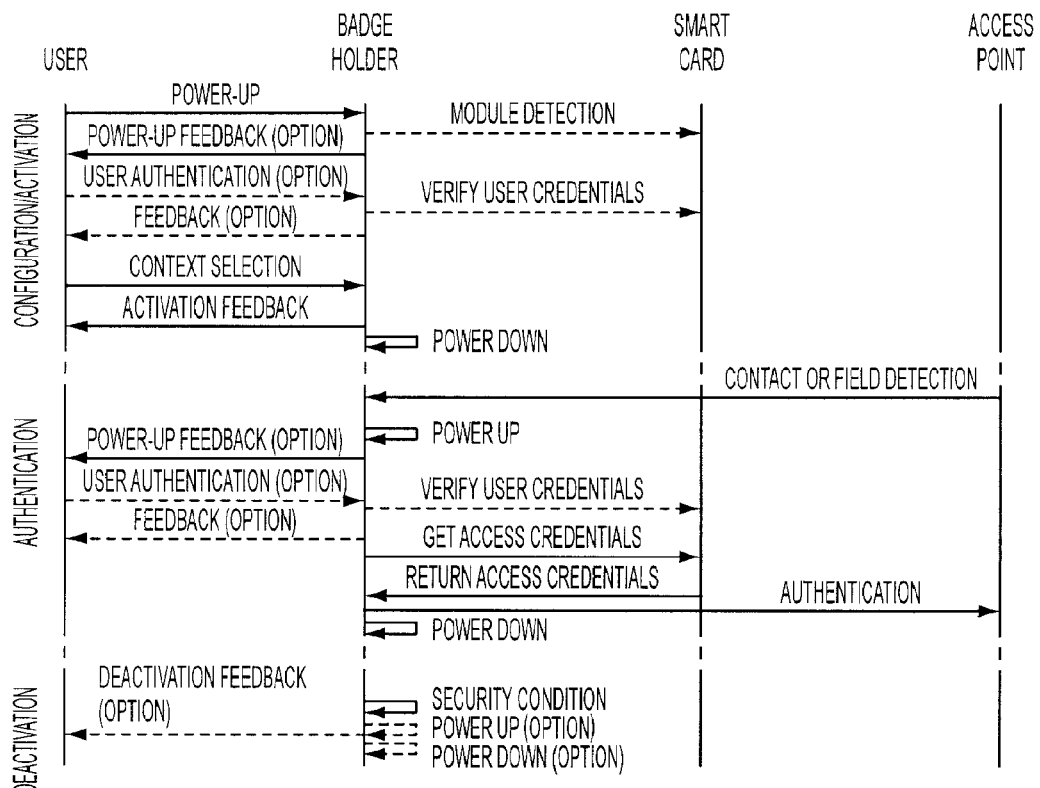
FIG. 5 is an illustration of a method for leveraging the portable authentication system of FIG. 1.

A first manual configuration method (FIG. 5.) for access includes but is not limited to the following sequence:

1. an optional first security module detection and installation step, when the security module is removable or can be disconnected.

2. In any order:
  optional user authentication within the security module as an optional pre-requisite to any further step to accommodate the organization security policy.
  optional explicit user consent by a manual operation, such as a button or trigger.
  a manual configuration step, using a manual interface, when the current or last credential and interface protocol selection must be changed.
  a credential transfer from the security module to the interface module 3. a credential release step through the contact or contactless interface when the interface module is connected to the access point or present in its contactless field.

Figure 7:
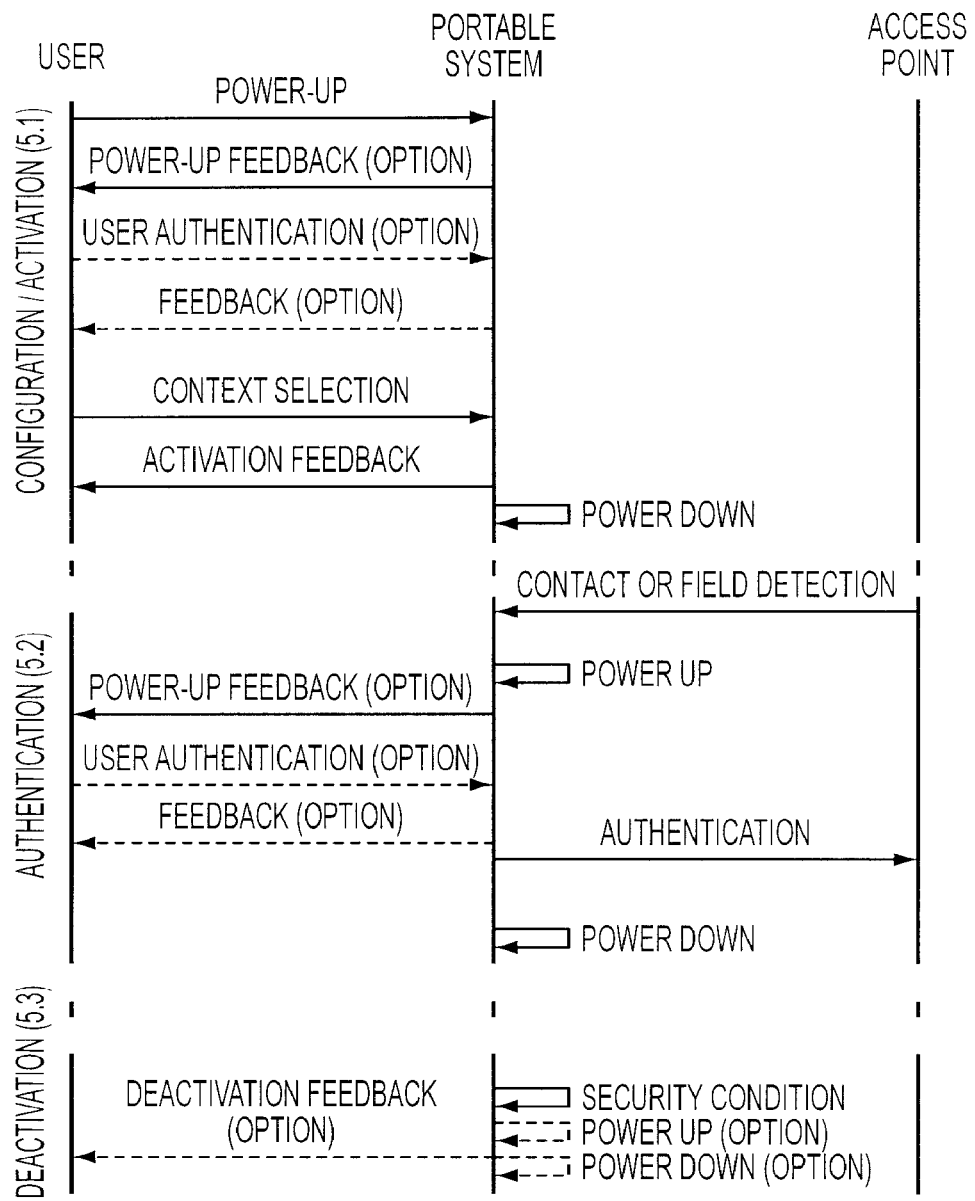
FIG. 7 is an illustration of another embodiment of the method of FIG. 5.

FIG. 7 describes the same method as above, but in a situation where the security module is not removable.

Figure 6:
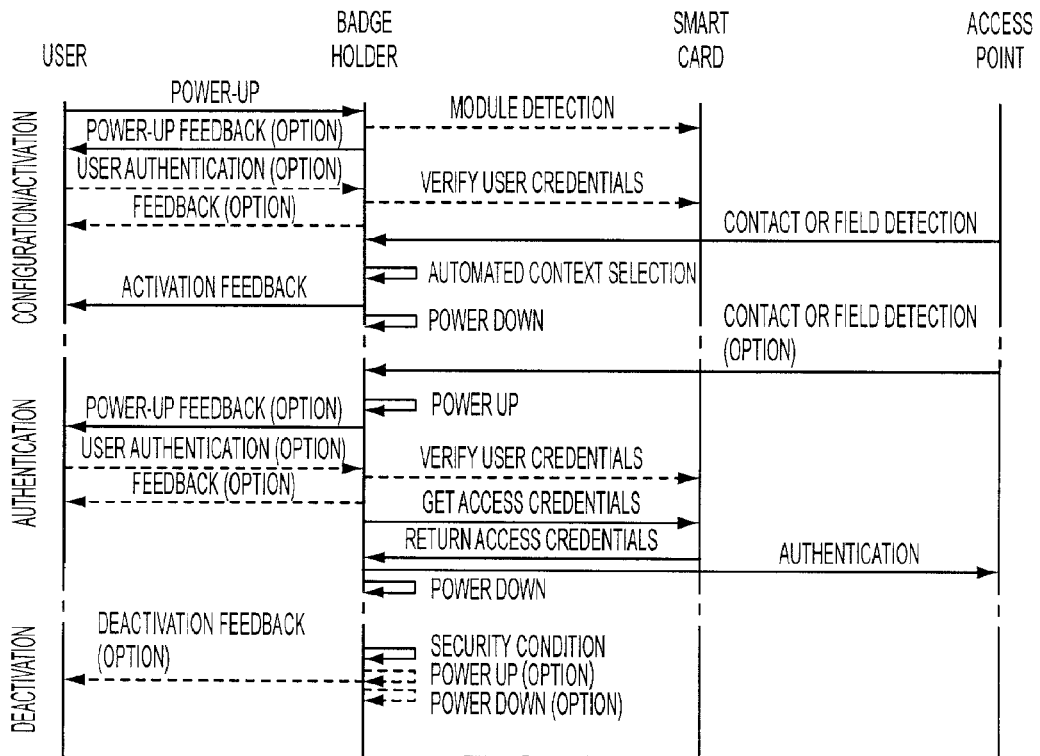
FIG. 6 is an illustration of another method for leveraging the portable authentication system of FIG. 1.

A second automated configuration method (FIG. 6.) includes but is not limited to the following sequence:

1. an optional security module detection and installation step, when the security module is removable or can be disconnected.

2. In any order:
  optional user authentication and verification within the security module as an optional pre-requisite to any further step to accommodate the organization security policy.
  optional explicit user consent by a manual operation, such as a button or trigger.
  an automated context detection step activated when the interface module enters a contactless field, and optionally providing feedback (audible or visual) to the user upon successful identification.
  a step for transferring the credential from the security module to the interface module 3. A step for releasing the credential through the contact or contactless interface when the interface module is connected to the access point or present in its contactless field. Note that the connection to the access point may have been previously established during the automated context detection step.

Additionally, upon a manual user consent function or successful user authentication, a timeout function can be activated that produces a timeout event when a given period is expired. Also for both manual and automated methods, a final step is available for deleting the credential from the interface module when the security module is removed or when a timeout event occurs. The credential may also be deleted when a specific number if credential uses is reached, or when an external asynchronous security event is intercepted by the interface module. Visual or audible feedback may be produced upon occurrence of such security events.

The above method shows how the configurable badge holder can be leveraged to improve the user experience. Several new methods can be derived with the following modifications:
  use of automatic context selection
  absence of user authentication
  absence of feedback
  absence of transient storage (the credentials are read from the smart card on demand)
  absence of timeout
  absence of user consent
  user authentication at different steps of the method.

We claim:

1. A portable authentication device, comprising:
  a subscriber identification module (SIM) that stores at least one credential that authenticates the device to an Access Control System having a plurality of access points;
  an access point interface component, separate from the SIM, that communicates with the plurality of access points and stores a plurality of interface protocols used to exchange data with the access points, wherein at least one of the access points uses a different protocol than another one of the access points and wherein at least one of the protocols is a contactless protocol; and
  an automated context selection component, separate from the SIM, that, without user physical input, automatically detects protocols used by each of the access points to exchange authentication data that authenticates the portable authentication device to the Access Control System.

2. A portable authentication device according to claim 1, wherein the contactless protocol is ISO 14443 compliant.

3. A portable authentication device according to claim 1, wherein the contactless protocol is conversational.

4. A portable authentication device according to claim 1, wherein the contactless protocol is non-conversational.

5. A portable authentication device according to claim 1, wherein the SIM is removable from the device.

6. A portable authentication device according to claim 5, further comprising:
 a security module detector that detects when the SIM is removed from the portable authentication device.

7. A portable authentication device according to claim 1, wherein the access point interface component uses information provided by a cellphone.

8. A portable authentication device, according to claim 1, further comprising:
 a contactless reader.

9. A portable authentication device, according to claim 1, further comprising:
 a wireless reader.

10. A portable authentication device, according to claim 1, wherein the automated context selection component uses global positioning system compliant information.

11. A portable authentication device, according to claim 1, wherein global positioning system compliant information is provided by a cellphone.

12. A portable authentication device, according to claim 1, further comprising:
 a credential erasing function.

13. A portable authentication device according to claim 1, wherein the SIM authenticates a user before releasing information protected by said SIM.

14. A portable authentication device according to claim 13, wherein the SIM confirms consent of a user before releasing any information protected by the SIM.

* * * * *